Oct. 23, 1962     C. J. BERST     3,060,035
AGING OF CHEESE IN CONSUMER SIZE PACKAGES
Filed Jan. 14, 1960
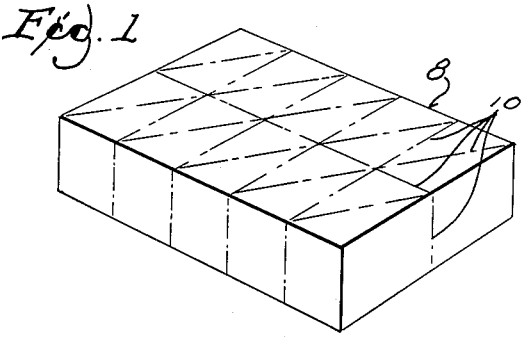
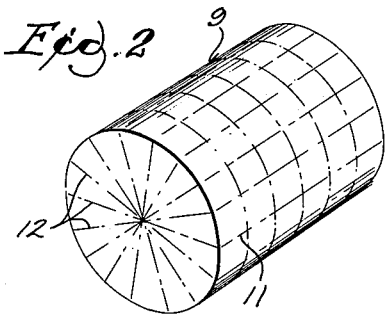
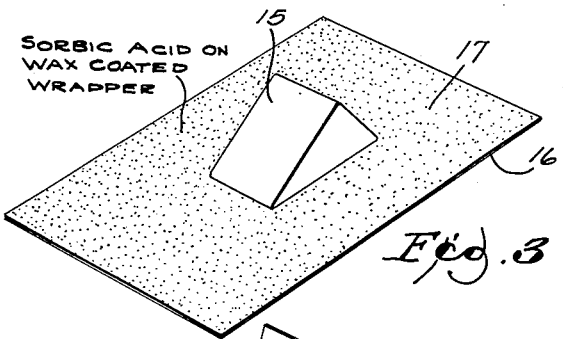
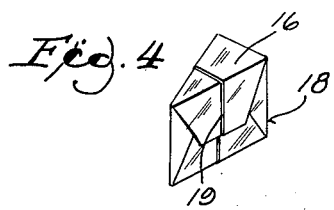
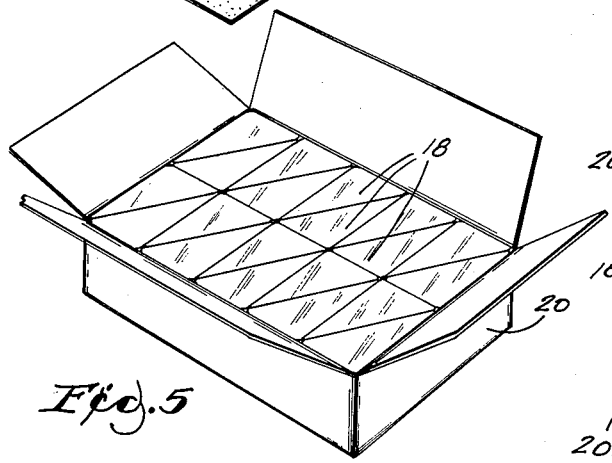
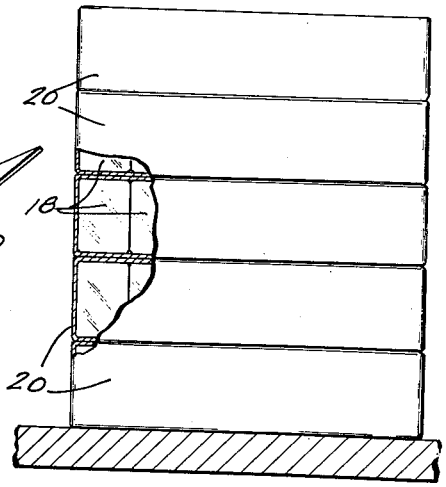
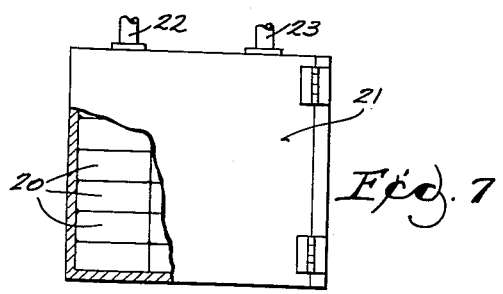
INVENTOR.
CARL J. BERST
BY
Wheeler, Wheeler & Wheeler
ATTORNEYS

United States Patent Office 3,060,035
Patented Oct. 23, 1962

3,060,035
AGING OF CHEESE IN CONSUMER SIZE
PACKAGES
Carl J. Berst, Madison, Wis., assignor to Armour and
Company, Chicago, Ill., a corporation of Delaware
Filed Jan. 14, 1960, Ser. No. 2,424
5 Claims. (Cl. 99—178)

This invention relates to the aging of cheese in consumer size packages.

The objective is to save a great deal of handling. In conventional commercial practice, cheese curd is pressed into blocks by packing it into hoops which are either rectangular or circular in cross section. The blocks usually weigh from five pounds to one hnudred pounds, more or less, depending somewhat on the kind of cheese and facilities available for handling its storage.

In preparation for storage, the cheese blocks are frequently exposed in order to dry the surface and are then paraffin coated or otherwise wrapped to minimize mold formation on the surface. When it is desired to avoid a hard, dry rind, the blocks are wrapped in sheeting so intimately applied that it takes the place of a rind or skin on the cheese.

After aging, the cheese is conventionally repackaged for the self-service markets. Popular size packages range in weight from one-half pound to one pound. The aged blocks are cut up into the required sizes and wrapped with suitable material, usually a plastic film, for acceptable display and sale on the self-service basis. A wrapper frequently so used is a wax coated plastic film treated with a mold inhibitor such as sorbic acid as approved by the Food and Drug Administration (21 F.R. 541, Jan. 25, 1956).

The present invention is based on the discovery that the green cheese or cheese curd can be packaged in consumer type wrappers or labels in small consumer size pieces prior to curing and the curring will nevertheless proceed even if the wrapper is optionally designed or treated to inhibit surface mold growth. By following the technique herein disclosed, several handling steps are eliminated and the cost of producing consumer size cuts of cheeses for the market is greatly reduced.

Cheese curing requires development of a culture of organisms within the cheese. Gas is developed and given off by the cheese as the curing progresses. It might be supposed that the conditions required for curing would be incompatible with wrapping techniques which are calculated to protect the cheese against surface mold formation during merchandising. However, I have shown that curing does proceed.

In the drawings:

FIG. 1 and FIG. 2 show in perspective large rectangular and cylindrical blocks of cheese respectively, the broken lines on the surface indicating where cuts are made in the molded curd or green cheese to subdivide it into consumer size pieces.

FIG. 3 is a view in perspective showing a consumer size piece of cheese laid upon a molded wrapper in which the cheese cut is about to be enveloped.

FIG. 4 shows in perspective a consumer size piece or cut of cheese as it appears when wrapped.

FIG. 5 is a view in perspective showing a box in which the wrapped consumer size cuts of cheese have been placed preliminary to curing but otherwise in readiness for sale.

FIG. 6 is a view in side elevation showing a stack of wrapped and boxed consumer size cuts of cheese as they appear in the aging procedure, portions being broken away in section.

FIG. 7 is a view diagrammatically showing in cross section a chamber having steam and vacuum connections for a preferred step of withdrawing accumulated gas from the wrapped packages after curing, and sealing the wrappers about the cheese.

Using conventional hoops of rectangular or circular or other cross section, the cheese curd is packed to make blocks such as that shown at 8 in FIG. 1 or 9 in FIG. 2. These blocks of green cheese, as shown, have been removed from the hoops. Instead of having a curing wrap applied thereto, they will immediately be subdivided to produce any appropriate size and shape of consumer size piece such as the conventional wedge-shaped piece 15 of FIG. 3. The lines 10 in FIG. 1, and 11 and 12 in FIG. 2, show appropriate locations where cuts may be made.

Each resulting consumer size piece is individually wrapped. By preference, the wrapping is done in a mold inhibiting wrapping film such as that shown at 16. A variety of such films may be used. Under certain conditions of use in which the film is sealed about the surface of the consumer size cut 15, the film may be saran or cellophane to which metal foil has been laminated, with or without a coating of wax, or it may comprise a cellophane film coated on both sides with saran by extrusion or lamination. In some instances, such a composite film is further laminated or coated with polyethylene before being coated with wax.

While there are many mold inhibitors known, sorbic acid and proprionates are two that have been approved for use in cheese as optional ingredients. If a mold inhibitor is used in the practice of the present invention, it is desirably not within the cheese but is either incorporated in the wax coating on the inner face of the wrapper or is added on the surface of the wax coating of the wrapper.

Since the cheese has not yet been cured at the time the consumer size piece is wrapped, the wrapper is not ordinarily tightly sealed but may be left sufficiently open to permit the escape of the gas developed during curing. The mold inhibitor on the wrapper will contact only the surface of the consumer size piece of cheese and will not inhibit curing but will prevent mold growth on the surface. If the wrapper is unsealed, it is particularly desirable that the wrapper be sufficiently large to have an ample lap of all margins so that any air moving into the wrapped package in response to atmospheric changes will have to pass for substantial distances in contact with sorbic acid or other mold inhibitor.

In the preferred practice of the present invention, I have used a wrapping film which is known as Du Pont K202 and which consists of cellophane with saran laminated to both faces by extrusion. This film is coated with wax and sorbic acid is then coated on the wax surface on the side thereof which is next to the cheese. The shading at 17 in FIG. 3 indicates the wax and sorbic acid coating about to be applied to the consumer size piece 15 of uncured cheese. The wrapper 15 is, as aforesaid, not an intermediate wrapper used only for curing but is the final consumer type wrapper or so-called label.

In the wrapped package 18 as shown in FIG. 4, a surface treated with sorbic acid is next to the cheese at all points and any air passages in the folds 19 lead past sorbic acid tretaed surfaces before air traversing such passages has entry to the cheese. To assure this, the overlaps are desirably substantial.

The packed consumer size pieces 18 are now actually placed in the merchandising box or container 20 as shown in FIG. 5 and in these wraps and containers in which they will ultimately be sold, the cheese is stacked as shown in FIG. 6 in warehouses of proper temperature for curing for proper periods until desired aging is achieved. When the wrapper is not sealed, only an occasional consumer size piece will show surface growth mold and this occurs only seldom and is not sufficient to be objectionable from a merchandising standpoint. Of course, sealing would exclude the air entirely, and the spores carried by the air. However, it is advantageous to permit the gas to escape from within the wrappers and accordingly the wrappers are desirably left unsealed, although in instances where sealing was practiced, the gas accumulations within the wrapper were not so large, ordinarily, as to be objectionable. It is only desired to note in this connection that, if curing takes place in a wrapper which has the necessary lap of surfaces treated with sorbic acid or the like, sealing is not essential.

Sealing sometimes occurs naturally because of the oily surface of the cheese. In packages sealed either purposely or intentionally, a brief exposure to vacuum during or following the curing period will withdraw the surplus gas. An ensuing steam treatment will re-seal the wrapper. In any event, the wrappers may be, and usually are, sealed prior to marketing the cheese. The sealing may be accomplished simply by natural oiling of the cheese causing the wrapping to adhere to the cheese itself as the result of the steam treatment. Alternatively, the wrapper may be heat sealed in a conventional way by causing the polyethylene material of lapping plies to adhere. In FIG. 7, I have diagrammatically illustrated a vacuum chamber 21 in which the packages 20 may be stacked for the purpose of withdrawing from their several wrappers gas accumulated during aging. The chamber has a vacuum line connection at 22 for this purpose. It also has a steam line connection at 23 whereby steam may be introduced into the chamber briefly to seal the wrappers, or to re-seal them if they were sealed originally.

Because the curing takes place in the consumer type label wrappers and boxes in which the cheese pieces are to be shipped for sale, all intermediate handling is eliminated, with great processing economies.

I claim:

1. The method of packaging and curing consumer size cuts of cheese comprising the steps of forming green cheese into consumer size pieces, individually enclosing the cheese pieces in a mold inhibiting wrapper having substantial lap margins so that air traversing the lapped margins pass for substantial distances in contact with the mold inhibiting wrapper surface, and aging the cheese enclosed in said wrapper.

2. The method of packaging and curing consumer size pieces of cheese comprisnig the steps of molding green cheese, cutting the green cheese into consumer size and shape pieces, enclosing the individual pieces in mold inhibiting wrapper so as to provide margins having substantial lap to cause air transversing the lapped margins to pass for substantial distances in contact with the mold inhibiting wrapper surface, aging the cheese to produce gas accumulation, and withdrawing accumulated gas from the enclosed cheese.

3. A method for packaging and curing consumer size pieces of cheese comprising the steps of molding cheese curd to make green cheese, subdividing the green cheese into consumer size and shape pieces, enclosing individual pieces of the green cheese in wrapper film treated to inhibit surface mold growth, the enclosing films having margins with substantial overlap, aging the cheese to produce gas accumulation, withdrawing the accumulated gas from the aged packages, and sealing the wrapping film about the cheese.

4. The method of curing consumer size pieces of cheese comprising the steps of molding cheese curd into green cheese, cutting the green cheese into consumer size and shape pieces, enclosing individual cuts of green cheese in unsealed wrappers having mold inhibitor coating on a surface next to the cheese, folding such wrapper about the cheese to provide substantial margin overlap so that air traversing the margins in response to atmospheric changes must pass for substantial distances in contact with the mold inhibitor wrapper surface, and aging the cheese in the unsealed wrapper.

5. The method of curing consumer size cuts of cheese comprising the steps of molding cheese into consumer size and shape pieces, wrapping individual pieces of green cheese into mold inhibiting wrapping film, folding said film around the cheese so as to provide substantial overlap margins which provide mold inhibiting treatment on wrapper surfaces so that air moving over the lapped margins in response to atmospheric changes passes for substantial distance in contact with the mold inhibiting wrapper surface, aging the cheese in the unsealed wrapper, vacuumizing the unsealed packages to thereby remove accumulated gas therefrom, sealing the vacuum theated packages, packing the sealed packages in consumer type cartons and continuing curing of the cheese in such cartons.

References Cited in the file of this patent

UNITED STATES PATENTS

| 1,054,433 | Masse | Feb. 25, 1913 |
| 2,109,093 | Rossman et al. | Feb. 22, 1938 |
| 2,227,748 | Golding | Jan. 7, 1941 |
| 2,963,375 | Allen | Dec. 6, 1960 |

OTHER REFERENCES

"Sorbic Acid as a Fungistatic Agent for Foods, VIII, Need and Efficacy in Protecting Packaged Cheese," by Smith et al., Food Technology, March 1954, pages 133–135.